DIGITAL CONFERENCING OF VOCODERS

Filed Aug. 29, 1967 6 Sheets-Sheet 1

INVENTORS J. M. KELLY
R. N. KENNEDY
BY C. E. Hirsch Jr.
ATTORNEY

Sept. 22, 1970 J. M. KELLY ETAL 3,530,246

DIGITAL CONFERENCING OF VOCODERS

Filed Aug. 29, 1967 6 Sheets-Sheet 2

DIGITAL CONFERENCING OF VOCODERS

Filed Aug. 29, 1967

3,530,246

DIGITAL CONFERENCING OF VOCODERS

James M. Kelly, Holmdel, and Richard N. Kennedy, Colts Neck, N.J., assignors to Bell Telephone Laboratories, Incorporated, Murray Hill and Berkeley Heights, N.J., a corporation of New York Filed Aug. 29, 1967, Ser. No. 664,023
Int. Cl. G10l *1/08*
U.S. Cl. 179—1 7 Claims

ABSTRACT OF THE DISCLOSURE

A system for the digital conferencing of vocoders is disclosed in which digital code words representing the speech of several simultaneous talkers are synchronized at a conference bridge by sets of shift-register synchronizing circuits corresponding on a one-to-one basis to the talkers. After synchronization, different groupings of simultaneously occurring digital code words are summed, on an RMS basis, to produce sequences of composite digital code words for transmission to the talkers. Each talker receives a sequence of composite code words representing the simultaneous speech of all the other talkers.

BACKGROUND OF THE INVENTION

This invention relates to the digital conferencing of vocoders and, in particular, to a digitized vocoder conference system capable of accurately reproducing the speech of both individual talkers and of several simultaneous talkers.

Prior art digital vocoder conference systems produce synthesized speech of low quality. This is primarily because the speech from each talker is passed through a first vocoder, then is reconverted into analog form for combining with the speech of other simultaneous talkers, and finally is passed through a second vocoder before reaching the listener. Such doubly vocoded speech is inferior in quality to that of singly vocoded speech.

Rader and Crowther, in the January 1966 Proceedings of the IEEE, page 95, propose a digital vocoder conferencing system which avoids double vocoding. Their system analyzes the speech of each talker and produces digital code words representing the energy in contiguous frequency bands of the speech. Simultaneously generated code words, representing the speech energy in corresponding frequency bands of the speech of several simultaneous talkers, are then compared in a comparison circuit and only the largest such code word in each frequency band is transmitted to the listener. Thus, the synthesized simultaneous speech is a composite of the loudest speech components selected from all the talkers. While individual talkers can be distinguished, and while what they are saying can sometimes be understood, not all the information generated by the talkers is transmitted. Thus, the quality of simultaneous speech is lower than desirable.

SUMMARY OF THE INVENTION

According to this invention, the quality of the speech synthesized by a digital vocoder conference system is improved over that of prior art systems by faithfully reproducing the combined speech of all simultaneous talkers rather than by reproducing composite speech composed of the loudest components from each of the several talkers. At the same time, the complexity of the analysis and synthesis equipment is reduced relative to the complexity of prior art digital vocoder conference systems.

In particular, to combine the speech of several simultaneous talkers according to this invention, the digital code words representing the speech energy in corresponding frequency bands of the speech of the several talkers are synchronized in unique shift-register synchronizing circuits corresponding on a one-to-one basis to the talkers. Selected groups of synchronized code words are then combined by taking the square root of the sum of the squares of the code words in each group—the so-called RMS or root mean square method of combination. The resulting composite sequences of code words are formed and transmitted to selected talkers in such a manner that a talker hears all other simultaneous talkers except himself. In addition, normalizing ensures that despite several loud talkers, the transmitted composite code words are not amplitude limited.

In one embodiment of this invention, each of a plurality of speaker stations is electrically connected to one of a multiplicity of interconnected conference bridges. Each station contains a vocoder analyzer for producing digital code words representing the speech produced by a corresponding talker, and a vocoder synthesizer for producing a replica of the speech, either single or simultaneous, of the other talkers.

Code words representing the speech produced by a given talker are transmitted from the speaker station to the corresponding conference bridge where they are synchronized with code words simultaneously generated by other talkers. As a feature of this invention, this synchronization is carried out in a highly efficient manner with negligible loss of information by use of three sets of storage registers in conjunction with each speaker station. Furthermore, this synchronization is carried out at each conference bridge independently of synchronization at the other conference bridges.

Thus, upon receipt at a conference bridge, the binary bits representing the code words produced by a given talker at a speaker station are transferred, in sequence, into a first shift register at a rate determined by a data clock at the speaker station. When this first register is full, that is, when it contains a so-called "frame" of data, the bits in this first register are transferred simultaneously to a second register. A conference bridge clock, with a frequency approximately equal to the frequencies of the data clocks at the stations, controls the simultaneous transfer of the data stored in this second register to a two-part third register. Code words are read out in series from this third register synchronously with the readout of other simultaneously generated code words from similar registers at the conference bridge.

Even though each conference bridge clock and the data clocks at the speaker stations have approximately the same frequencies, their frequencies are not identical. Consequently, once in a while data in the second register will be either transferred twice to the third register, or not transferred at all. But because of the approximate synchronization of the conference bridge and station data clocks, such data redundancy or loss occurs relatively infrequently.

After synchronization, the digital code words representing the speech of a given talker are combined with the digital code words representing the speech of any other simultaneous talkers. To do this, each bridge is provided with a plurality of digital combining circuits associated on a one-to-one basis with the stations and other conference bridges connected to it. These circuits combine, on an RMS basis, the digital code words representing the speech of the several simultaneous talkers to produce sequences of composite code words representing the composite speech of several selected groups of talkers. Each sequence is then sent to a corresponding speaker station or conference bridge. The sequence of code words sent to each speaker station represents the simultaneous speech of all talkers except the talker at that station.

Sometimes the combination of digital code words representing the speech of several simultaneous talkers produces composite digital code words with amplitudes greater than can be represented by the number of digits available, particular if all the talk is loud. To remedy this, and to minimize the effect of noise on the quality of the speech synthesized at each station, apparatus is provided by which only normalized versions of the composite code words are transmitted to listeners. This is done by dividing each composite digital code word by a normalizing factor derived from the maximum amplitude digital code word in each frame of code words. Both the normalizing factor and the normalized code words are transmitted to a corresponding speaker station or conference bridge for use in producing a replica of the composite speech.

The digital vocoder conference system of this invention makes possible a secure conference speech arrangement which produces synthesized speech of a quality heretofore unobtained. The system can use either pitch-excited or voice-excited vocoders. Yet both the complexity and the cost of the system are substantially reduced relative to the complexity and cost of prior art systems.

This invention may be more fully understood from the following detailed description of one embodiment thereof. taken together with the following drawings.

DETAILED DESCRIPTION

Figures 1, 7:
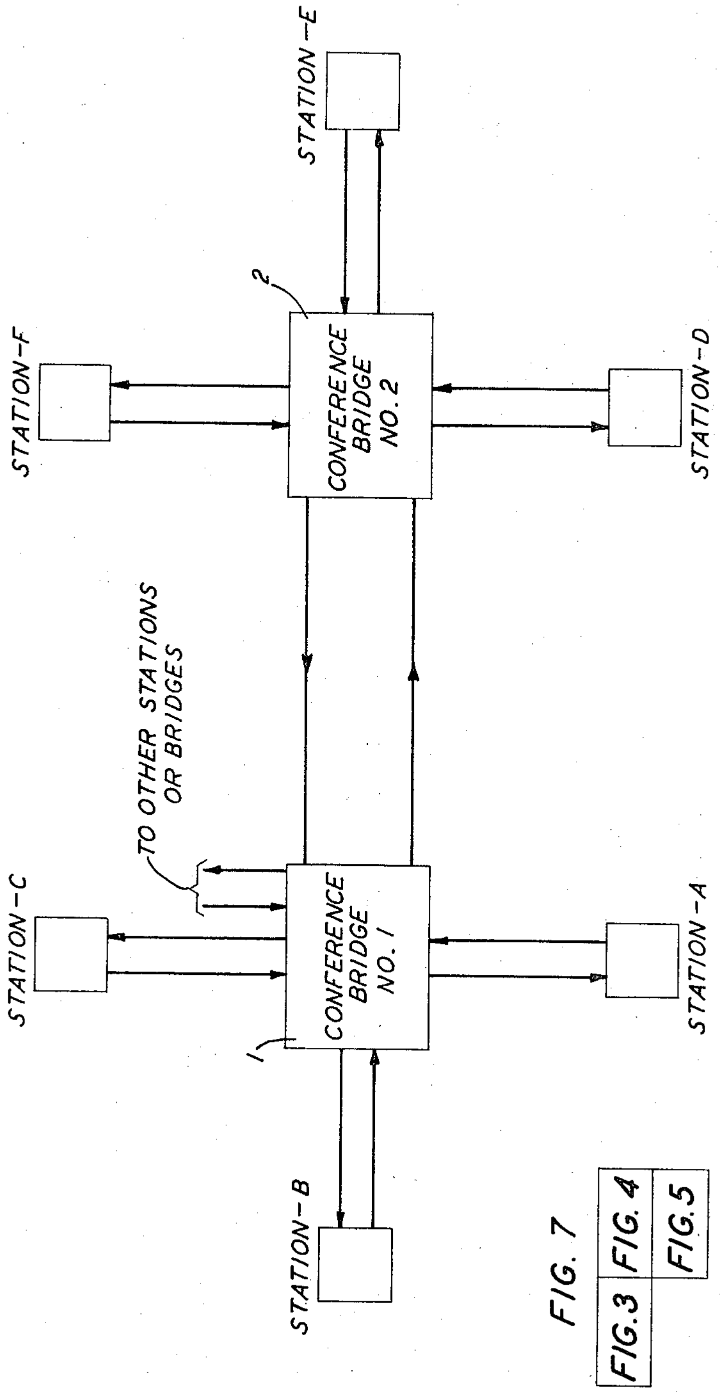
FIG. 1 is a schematic block diagram of an embodiment of this invention using two conference bridges.
FIG. 7 shows the proper arrangement of FIGS. 3, 4 and 5.

FIG. 1 shows a typical conference arrangement using the principles of this invention. Stations A through F are interconnected through conference bridges 1 and 2. Of course, other conference bridges and speaker stations can be connected, if desired, to either bridge, and the number shown and described in this specification is selected for convenience only.

Each station contains a vocoder analyzer for converting the speech of a talker at that station into digital code words, and a vocoder synthesizer for producing a replica of the single or composite speech of other talkers at the other stations. In addition, each station has its own data clock for controlling the bit rate of the digital data produced at that station. Data clocks at all the stations differ in frequency by approximately one part in $10^5$. Thus, essentially each station produces 100,000±1 data bits in the same time period. A data bit is represented by either the presence or absence of a voltage pulse. The amplitude of the pulse determines whether it represents a binary 1 or 0.

Each conference bridge 1, 2 receives data bit streams from each of the stations connected directly to the conference bridge. In addition, conference bridge 1, for example, receives code words from conference bridge 2. These code words represent either the single or simultaneous speech of talkers at the several stations connected to conference bridge 2. Bridge 1 processes these code words just as though they were digital code words representing the speech of a single talker at a separate station connected to bridge 1.

Figure 2:
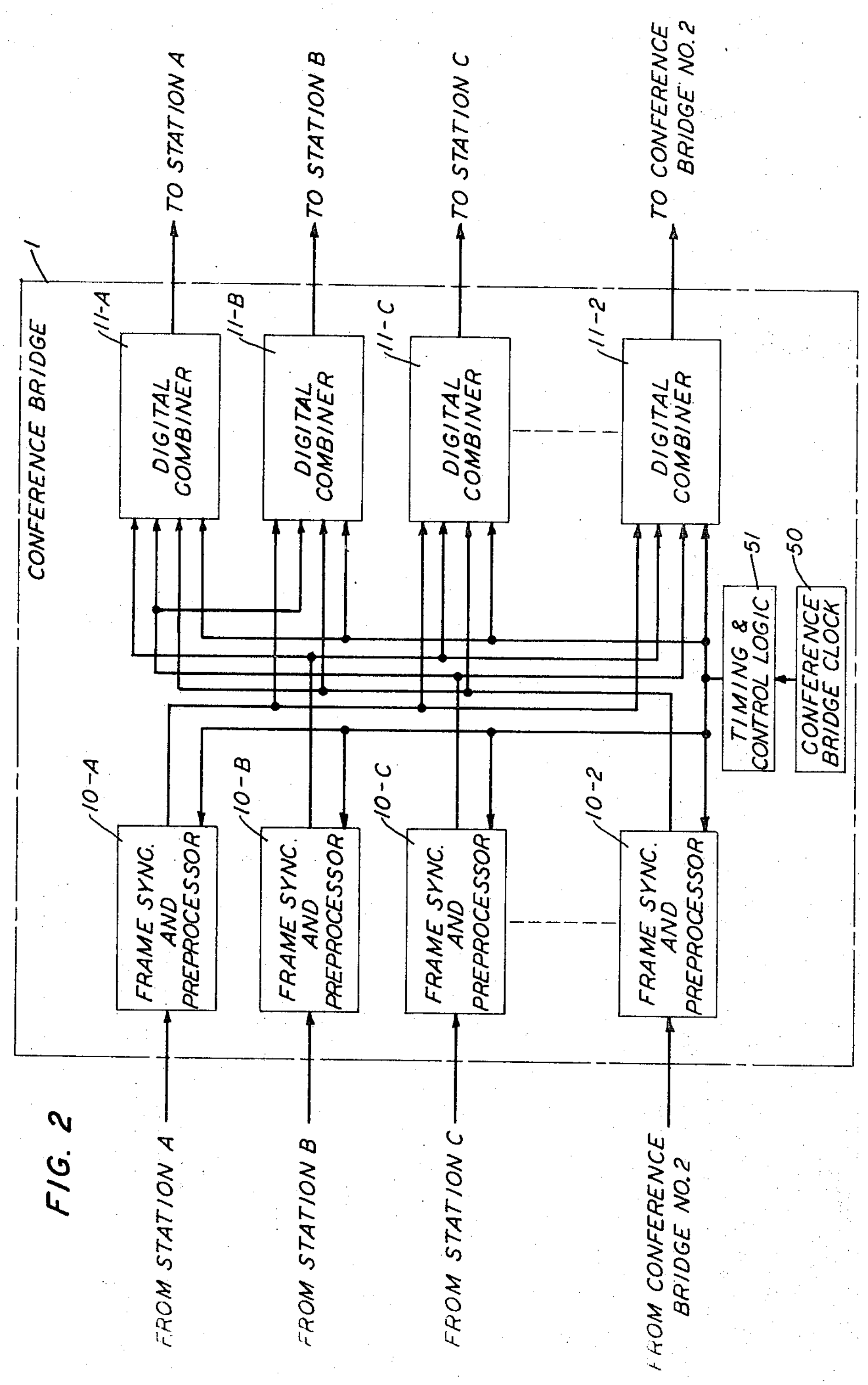
FIG. 2 is a schematic block diagram of one of the conference bridges shown in FIG. 1.

FIG. 2 shows conference bridge 1 in more detail. Conference bridge 2 is, of course, similar in structure and function. Stations A, B and C, together with conference bridge 2, are joined at conference bridge 1. As shown in FIG. 2, the digital code words representing the speech of the talker at station A pass through frame synchronizer and preprocessor 10–A. Similarly, the digital code words representing the speech of the talkers at stations B, C, and conference bridge 2 pass through synchronizers and preprocessors 10–B, 10–C, and 10–2, respectively. Essentially, synchronizers and preprocessors 10–A, 10–B, 10–C, and 10–2 synchronize the digital code words, if any, representing the speech of simultaneous talkers at stations A, B, C, and conference bridge 2. The resulting synchronized digital code words are then combined in selected combinations in digital combiners 11–A, 11–B, 11–C, and 11–2, to produce composite code words for transmittal to stations A, B, C, and conference bridge 2.

Thus digital combiner 11–A, for example, combines, on an RMS basis, the synchronized digital code words representing the speech of talkers at stations B, C, and conference bridge 2, for transmission to station A. Consequently, a talker at station A hears the speech generated at all stations except his own. Digital combiners 11–B, 11–C and 11–2 work in a similar manner but prepare composite code words for transmission to stations B, C and conference bridge 2, respectively. These composite code words are such that talkers at stations B and C and the stations connected to bridge 2 also hear all but their own speech.

Figure 3:
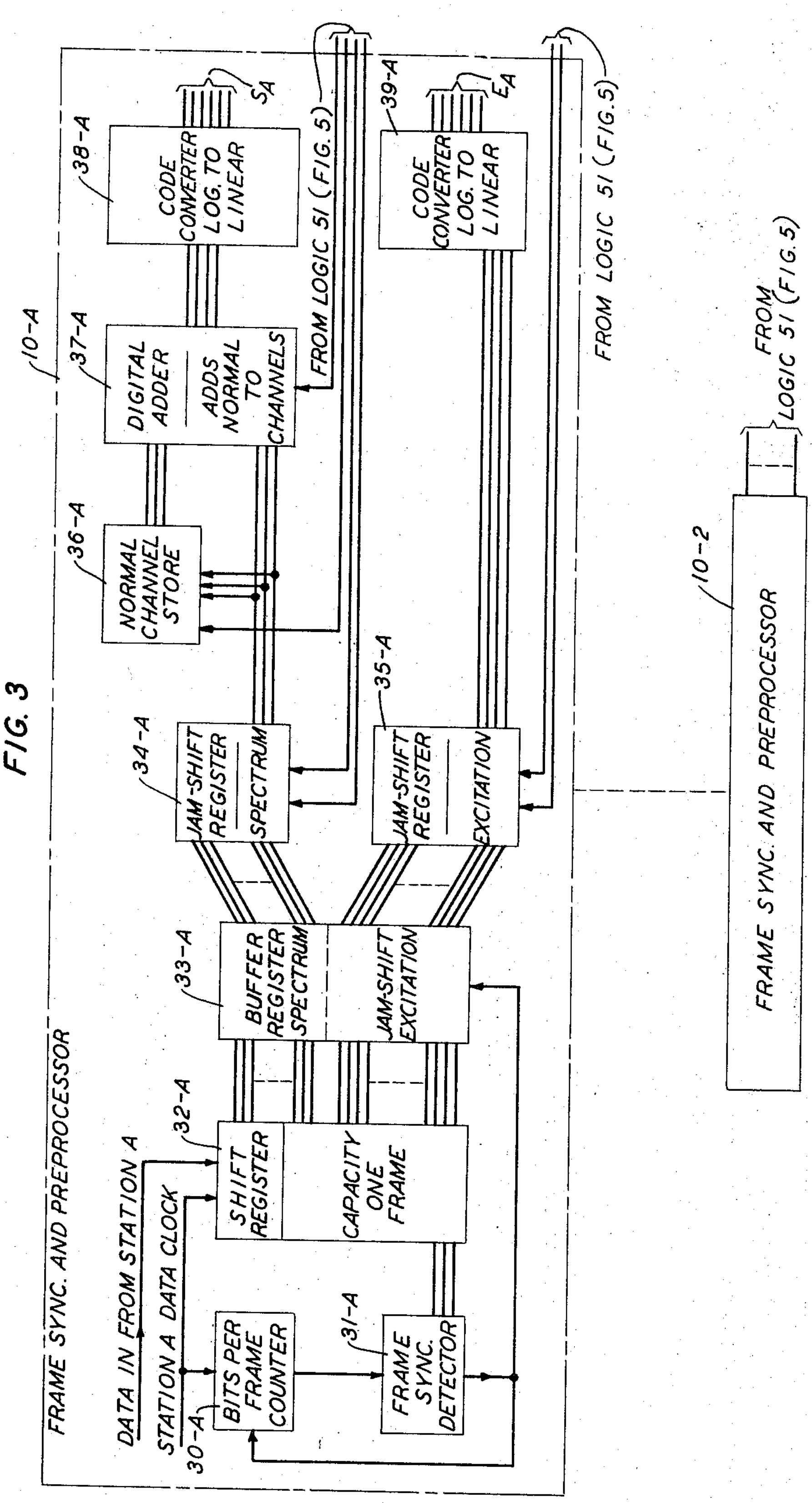
FIG. 3 is a schematic block diagram of frame synchronizer and preprocessor 10–A shown in FIG. 2.

FIG. 3 shows in more detail frame synchronizer and preprocessor 10–A shown in FIG. 2. Only synchronizer and preprocessor 10–A will be described in detail, since synchronizers and preprocessors 10–B, 10–C and 10–2 work in an identical manner on different input signals.

Figure 6:
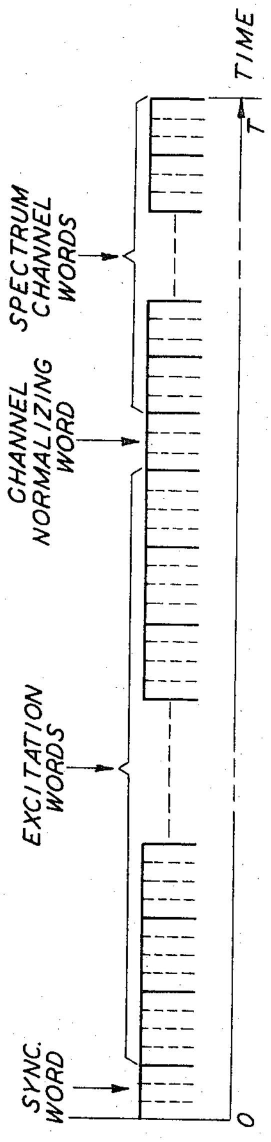
FIG. 6 shows the format of one frame of data received from a typical speaker station shown in FIG. 1.

As shown in FIG. 3, the bits in the digital code words representing the speech of talkers at station A serially enter shift register 32–A. Shift register 32–A has a capacity of one frame of data. As shown in FIG. 6, a frame of data from the vocoder analyzer at a typical station contains first a synchronization code word generated by the station data clock. The next few words in the frame represent the excitation control signals. As is well known in the vocoder arts, the excitation control signals tell whether the speech is voiced or unvoiced, and if voiced, give its pitch frequency. A channel normalizing word follows the excitation code words. This word contains the information necessary to denormalize the code words representing the amplitude of the speech—the so-called spectrum channel code words. The spectrum channel code words follow the channel normalizing code word and represent the amplitudes of subsignals occupying contiguous frequency bands of the speech signal.

The total number of bits contained in each frame of data from a station is known. Bits-per-frame-counter 30–A (FIG. 3) counts the number of bits in the frame. When the count reaches the maximum number of bits in a frame, counter 30–A signals frame synchronization detector 31–A to check for the synchronization or "sync" word in a specific location of shift register 32–A. When the sync word appears in the specific location, a frame of data from station A is located properly in the register and a station frame pulse is generated. In response to this pulse, the frame of data, less the sync word, is "jammed," that is, simultaneously transferred, into buffer register 33–A. Counter 30–A now begins counting the bits of a new frame. This counting and transferring process continuously repeats itself with the result that ordered frames of data from station A are held in buffer 33–A for the period of one frame as measured by the station A frame counter 30–A. Station A frame counter 30–A, in turn, is slaved to the station A data clock.

Figure 5:
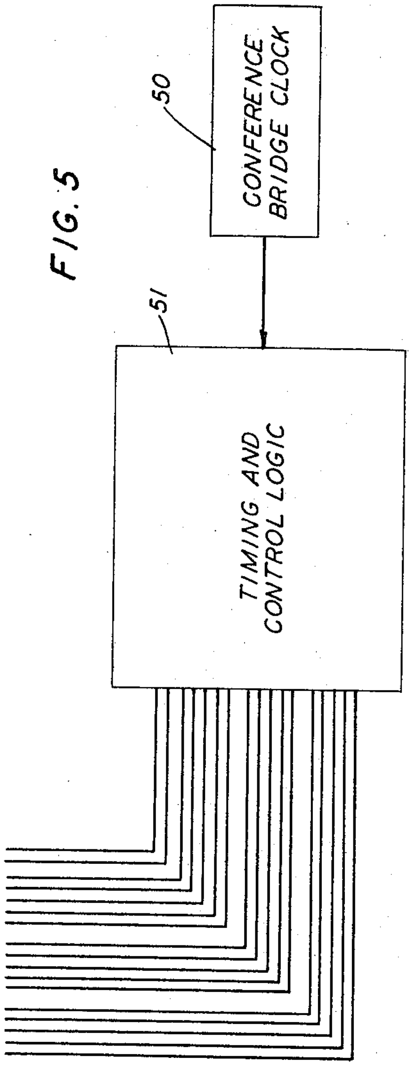
FIG. 5 shows schematically the timing and control logic 51 and conference bridge clock 50 used to control synchronizers and preprocessors 10–A through 10–2 in FIG. 3 and combiners 11–A through 11–2 in FIG. 4.

As mentioned above, the data clocks of all the stations are close in frequency both to each other and to the conference bridge clock 50 (FIG. 5). Unfortunately, manufacturing tolerances and environmental differences cause these clocks to have slightly different frequencies. And of course the phases of the output pulses from these clocks are not synchronized. Thus, frames of data from stations A, B, C. D, E and F (FIG. 1) are held in each station's corresponding buffer register 33 (FIG. 3) for about the same period of time but are changed at arbitrary times relative to one another.

Now, according to this invention, pulses from timing and control logic 51 (FIGS. 1 and 5) driven by conference bridge clock 50 and called for convenience "frame pulses," are used to transfer simultaneously all the frames of data in buffer registers 33–A, 33–B, 33–C and 33–2 (FIG. 3—the last three registers are not shown) from these registers to corresponding ones of so-called jam shift registers 34 and 35. Only jam shift registers 34–A and 35–A are shown in FIG. 3. Thus, a frame of data stored in buffer register 33–A is transferred, in response to a frame pulse, to jam shift register 34–A and to jam shift register 35–A. Register 34–A holds the channel normalizing code word representing the normalizing information, and the spectrum code words representing the amplitudes of subsignals occupying continguous frequency bands of the speech signal. Register 35–A holds the excitation code words. The code words stored in jam-shift registers 34–A and 35–A are in turn transferred out of these registers simultaneously with any code words stored in jam-shift registers 34–B, 34–C, 34–2, and 35–B, 35–C, and 35–2 (none of which are shown), in response to gating pulses transferred from logic 51 (FIG. 5).

The spectrum code words representing the speech of the talker at station A leave register 34–A (FIG. 3) as normalized 3-bit code words. The first digital code word to leave register 34–A represents the normalizing factor. This code word is transferred to normalizing channel store 36–A by a signal from logic 51. The remaining digital code words to leave register 34–A are transmitted, in series, to digital adder 37–A. As a normalized spectrum code word arrives at adder 37–A, it is denormalized by being added to the normalizing code word stored in store 36–A. After this addition, the denormalized code word emerges from adder 37–A as a 4-bit logarithmic code word. Digital code converter 38–A, of a type well known in the digital arts, then removes the logarithmic compression of this 4-bit code word by converting it to a 6-bit linear code word. Thus, the output code words from converter 38–A, represented in FIG. 3 by the symbol $S_A$, are 6-bit linear digital code words in serial order, ready for combining with corresponding digital code words, if any, from stations B, C, and conference bridge 2.

4-bit code words representing the excitation information from station A are processed through a similar log-to-linear converter 39–A to produce 6-bit linear digital code words, represented in FIG. 3 by the symbol $E_A$. These converted excitation code words are ready for combination with similarly processed excitation code words from stations B, C, and bridge 2.

Thus, frame synchronizer and preprocessor 10–A essentially converts each frame of logarithmically encoded digital code words from station A, asynchronous relative to similar frames of code words from stations B and C and conference bridge 2, into linearly encoded code words synchronized with similarly processed linear code words representing the speech from stations B, C and conference bridge 2.

The problem now is to combine the synchronized frames of linearly encoded digital code words representing simultaneous speech generated at different stations so that each station receives a replica of the speech generated at all other stations.

Figure 4:
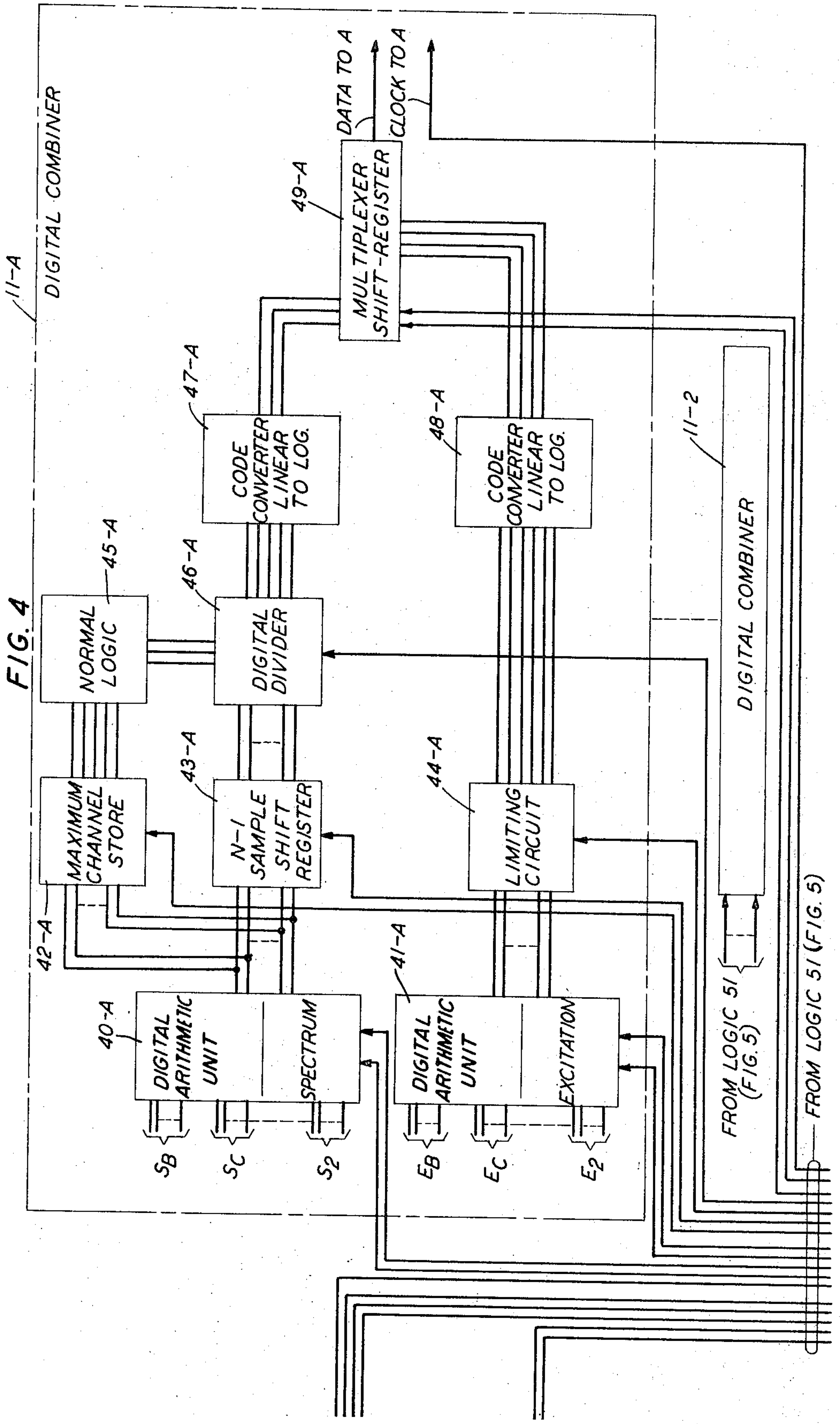
FIG. 4 is a schematic block diagram of digital combiner 11–A shown in FIG. 2.

This is done on an RMS basis in digital combiners 11–A, 11–B, 11–C and 11–2 (FIG. 2). A typical digital combiner 11–A is shown in FIG. 4. The operation of this combiner will be described in relation to the operation of combiners 11–B, 11–C, and 11–2 shown in FIG. 2 These last three digital combiners process different digital code words in a manner identical to that of combiner 11–A, and thus will not be described in detail.

Figure 8:
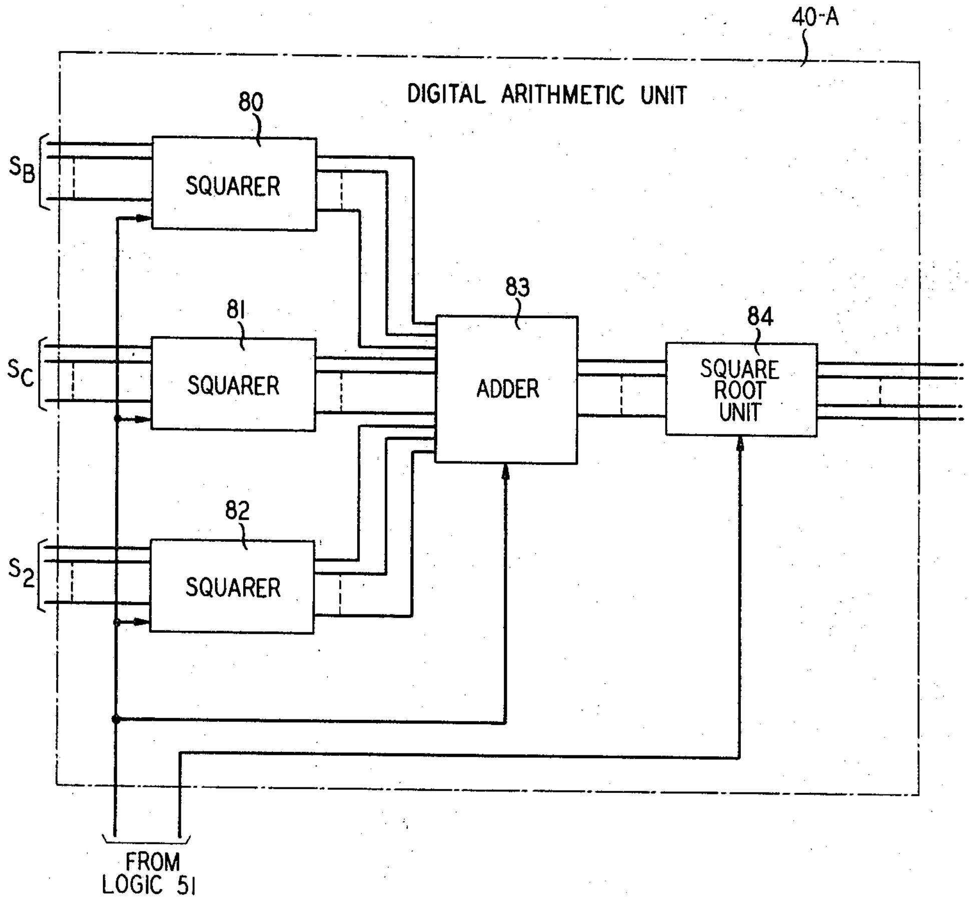
FIG. 8 shows details of a digital arithmetic unit, typical of those which may be used at 40–A and 41–A of FIG. 4.

Digital combiner 11–A combines the synchronized order frames of digital code words emerging from converters 38–B, 38–C and 38–2 (none of which are shown), and represented by the symbols $S_B$, $S_C$ and $S_2$, to produce a composite set of code words for transmission to station A. Thus, digital arithmetic unit 40–A combines on a RMS basis the synchronized spectrum code words from stations B, C, and conference bridge 2. Arithmetic unit 40–A is shown in greater detail in FIG. 8. As described above, the frames of digital code words from stations B and C, and from conference bridge 2 have been synchronized by synchronizer and preprocessor 10–B, 10–C and 10–2, (FIG. 2), respectively. Thus, at a given instant the digital code words entering arithmetic unit 40–A (FIG. 8) represents the amplitudes of the subsignals in corresponding frequency bands of the speech of the talkers at stations B, C, and conference bridge 2. At this instant, the respective code words supplied to arithmetic unit 40–8 as shown in FIG. 8, are squared in digital squarers 80, 81 and 82. The squared digital code words are then summed in adder 83. In turn the square root of the sum is obtained via square root unit 84 to produce a composite digital code word representing the RMS of the input code words. In the next instant the digital code words on the leads to arithmetic unit 40–A represents the next subsignals from the speech of the speakers at stations B, C, and conference bridge 2. Accordingly, another composite digital code word is generated in arithmetic unit 40–A by squaring and summing these respective input code words and then square rooting the resulting sum. This process continues for the remainder of the frame, thereby producing a frame of composite digital code words.

An identical process is performed in arithmetic unit 41–A on the digital code words $E_B$, $E_C$ and $E_2$ representing the excitation information in the speech of the talkers from stations B, C, and conference bridge 2. It should be noted that the composite excitation information often must be further processed to produce meaningful excitation signals. This will be discussed later.

As mentioned above, when each talker at stations B, C and conference bridge 2 is talking loudly, the sum of their speech is apt to be well beyond the amplitude range within which the system operates linearly. Yet this condition, unmodified, produces distorted speech at each station. To prevent this, normalizing apparatus is provided consisting of maximum spectrum code word storage 42–A, N–1 sample shift register 43–A, normalizing logic 45–A and digital divider 46–A.

The composite digital code words are read out of arithmetic unit 40–A in response to pulses from logic 51 (FIG. 5). Storage 42–A (FIG. 4) monitors the composite digital code words and detects and stores the maximum amplitude composite spectrum code word. Shift register 43–A retains all the composite spectrum code words in one frame so that in the unlikely event the normalizing factor is derived from the last composite code word in the frame, all the preceding code words in the frame can still be normalized.

Normalizing logic 45–A receives the maximum composite spectrum code word from storage 42–A. Logic 45–A compares this maximum composite code word with the maximum possible 5-bit code word. Logic 45–A then divides this maximum 5-bit code word into the maximum composite code word from storage 42–A to yield the normalizing factor. Digital divider 46–A, driven by signals from logic 51 (FIG. 5), then divides this normalizing factor into the composite spectrum code words read from shift register 43–A in response to control pulses from logic 51. The result is a sequence of normalized 5-bit linear code words representing these composite spectrum code words.

Linear-to-log code converter 47–A then converts the 5-bit linear normalized composite code words to 3-bit logarithmic code words. This reduction in the number of bits is necessary to keep the bit rate within the channel capacity of the conference system. The output code words from converter 47–A are placed in multiplexer shift register 49–A where they are joined with composite excitation code words for transmittal, in data frames, to speaker station A.

The composite excitation code words for transmission to speaker station A are derived in digital adder 41–A. Arithmetic unit 41–A combines, on an RMS basis, cynchronized sequences of excitation code words from the synchronizing and preprocessing apparatus associated with speaker stations B and C and conference bridge 2. Thus, the excitation signal sent to speaker station A is an RMS composite of the excitation signals generated by all simultaneous talkers except the talker at station A.

The sequence of composite excitation code words from arithmetic unit 41–A, is further processed in limiting circuit 44–A. Circuit 44–A essentially passes undistorted the composite excitation code words, provided these composite excitation code words are beneath a selected maximum. If, however, these composite code words exceed this maximum, circuit 44–A limits the composite code words to this maximum. As a result, the fundamental frequency of the composite speech, represented by the composite excitation code words, is limited to a maximum value.

The 6-bit linear encoded composite excitation code words from circuit 44–A are converted in linear-to-log converter 48–A to 4-bit logarithmically encoded composite code words. These logarithmically encoded composite code words are joined in shift register 49–A, as previously described, with the logarithmically encoded composite spectrum code words to produce frames of composite code words for transmittal to speaker station A.

The above described system for the digital conferencing of vocoders is unique in several respects.

First, the digital code words arriving at each conference bridge are synchronized independently of the synchronizing process at the other conference bridges. This eliminates the need for synchronizing the conference bridges with the resulting decrease in system complexity and cost.

Second, digital code words arriving at a conference bridge are synchronized at that conference bridge by a unique arrangement of storage registers. Because the conference bridge clock which drives these storage registers has a frequency approximately equal to the frequency of each station data clock, synchronization is achieved with little or no loss of, or redundancy of, data.

Last, the synchronized digital code words are combined at each bridge of an RMS, or power, basis. This combination technique, it has been discovered, closely approaches the mechanism by which the ear combines the speech of several simultaneous talkers. The resulting composite speech, therefore, is improved in naturalness over the composite speech produced by prior art vocoder conference systems.

While one embodiment of this invention has been described in detail, the principles of this invention can readily be extended by those skilled in the vocoder arts to other conference arrangements. Of course, code words with different numbers of bits than used in the described embodiment can also be used with this invention if adequate channel capacity is provided. Thus the principles of this invention are not limited to the actual illustrative embodiment described. Furthermore, while simultaneously generated digital code words are combined on an RMS basis in the embodiment described, such code words can be combined, if desired, by adding them directly or by adding versions of these code words weighted according to some rule. While this is done quite easily by replacing arithmetic units 40–A and 41–A by either regular digital adders, or combined weighting and digital adding circuits, the quality of the resulting composite speech is lower than when the code words are combined on an RMS basis.

What is claimed is:

1. Apparatus which comprises means for representing the speech of each of a plurality of talkers by a corresponding set of digital code words, means for synchronizing simultaneously occurring sets of digital code words, means for combining, on an RMS basis, the synchronized sets of digital code words to produce a plurality of sets of composite digital code words, each of said sets of composite digital code words corresponding to one of said plurality of talkers, and means associated with each talker for producing from the corresponding set of composite digital code words a replica of the speech generated by the other talkers.

2. Apparatus as in claim 1 wherein said means for representing includes means for dividing the speech of each of said plurality of talkers into subsignals occupying contiguous frequency bands, means for deriving excitation control signals indicating whether the speech of each of said plurality of talkers is voiced or unvoiced, and if voiced, giving the pitch frequency, and means for converting the subsignals and excitation control signals representing the speech of each talker into said corresponding set of digital code words.

3. Apparatus as in claim 2 wherein said means for synchronizing comprises means for synchronizing both the digital code would representing subsignals occupying corresponding frequency bands of the speech of simultaneous talkers and the digital code words representing said excitation control signals.

4. Apparatus as in claim 2, wherein said means for synchronizing comprises a clock for producing synchronization pulses, and a plurality of sets of registers and counters corresponding on a one-to-one basis to said plurality of talkers, each set of registers and counters comprising a first shift register for receiving and storing binary bits representing digital code words of the talker corresponding to said set of registers and counters, means for counting the number of bits placed in said first shift register, means for producing a control pulse when the count in said counting means reaches a selected value, a second register, for simultaneously receiving in response to said control pulse, the binary bits stored in said first register, and a third register including a first and a second part, said first part for simultaneously receiving, in response to each of said synchronization pulses, those binary bits stored in said second register representing the subsignals occupying contiguous frequency bands of the speech of said corresponding talker, and said second part for simultaneously receiving, also in response to each of said synchronization pulses, the binary bits stored in said second register representing the excitation control signals derived from the speech of said corresponding talker.

5. Apparatus as in claim 2, wherein said means for combining includes means for squaring simultaneously occurring digital code words in the synchronized sets of digital code words, means for adding the squared code words to produce a sum code word, and means for taking the square root of said sum signal thereby to produce a composite digital code word proportional to the square root of the sum of the squares of said simultaneously occurring code words.

6. A system for the digital conferencing of vocoders which comprises a plurality of speaker stations, each containing a vocoder analyzer for converting speech into outgoing digital code words, and a vocoder synthesizer for converting incoming digital code words into speech, a multiplicity of conference bridges interconnecting said speaker stations, each of said conference bridges including means for synchronizing simultaneously occurring sequences of digital code words produced by the speaker stations and conference bridges connected to said conference bridge, and means for combining, on an RMS basis, said synchronized sequences of digital code words to produce a number of composite sequences of code words for transmission to the speaker stations and conference bridges connected to said conference bridge, each of said composite sequences representing the composite speech of all simultaneous talkers except those at the speaker station or conference bridge to which it is sent.

7. Apparatus as in claim 6, wherein said means for synchronizing comprises a clock for producing synchronization pulses, and a plurality of sets of registers and counters corresponding on a one-to-one basis to the speaker stations and conference bridges connected to said conference bridge, each set of registers and counters comprising a first shift register for receiving and storing binary bits representing digital code words received from the speaker station or conference bridge corresponding to said set of registers and counters, means for counting the number of bits placed in said first shift register, means for producing a control pulse when the count in said counting means reaches a selected value, a second register, for simultaneously receiving in response to said control pulse, the binary bits stored in said first register, and a third register including a first and a second part, said first part for simultaneously receiving, in response to each of said synchronization pulses, those binary bits stored in said second register representing spectrum channel code words, and said second part for simultaneously receiving, also in response to each of said synchronization pulses, those binary bits stored in said second register representing excitation code words.

References Cited

IBM Technical Disclosure Bulletin, July 1965, Shift Register, J. E. Meggitt.

KATHLEEN H. CLAFFY, Primary Examiner

J. B. LEAHEEY, Assistant Examiner